(12) United States Patent
Cook

(10) Patent No.: US 8,334,975 B1
(45) Date of Patent: Dec. 18, 2012

(54) INTEGRATED 3-CHANNEL GAS DETECTION AND MEASUREMENT SPECTROMETER

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/245,199

(22) Filed: Sep. 26, 2011

(51) Int. Cl.
*G01J 3/28* (2006.01)

(52) U.S. Cl. .................................................. 356/326

(58) Field of Classification Search .................. 356/326, 356/328, 334
See application file for complete search history.

(56) References Cited

U.S. PATENT DOCUMENTS

| | | | |
|---|---|---|---|
| 5,260,767 A | 11/1993 | Cook | |
| 5,638,173 A * | 6/1997 | Smith et al. | 356/301 |
| 7,382,498 B1 | 6/2008 | Cook | |
| 2010/0110539 A1 | 5/2010 | Cook | |

* cited by examiner

*Primary Examiner* — Tarifur Chowdhury
*Assistant Examiner* — Abdullahi Nur
(74) *Attorney, Agent, or Firm* — Christie, Parker & Hale, LLP

(57) ABSTRACT

A three-channel spectrometer including: a beamsplitter element that receives an incident radiation and transmits a first portion, a second portion, and a third portion of the incident radiation, a first slit that receives the first portion and transmits a first slit output radiation of a first wavelength range; a second slit that receives the second portion and transmits a second slit output radiation of a second wavelength range; a third slit that receives the third portion of the incident radiation and transmits a third slit output radiation of a third wavelength range; a common optical form that receives and collimates the first, second, and third slit output radiation; and a dispersive element that receives and reflects the collimated first, second, and third slit output radiation from the optical form.

16 Claims, 5 Drawing Sheets

INTEGRATED 3-CHANNEL GAS DETECTION AND MEASUREMENT SPECTROMETER

FIELD

The present invention is related to a spectrometer, and, more particularly, to an integrated 3-channel gas detection and measurement spectrometer.

BACKGROUND

Certain spectrometers cover a wide spectral band with moderate spectral resolution. However, for gas detection and measurement, only certain narrow spectral lines need to be detected, but they must be sensed with very high spectral resolution. Spectral resolution of 20,000 VAX is not an uncommon requirement.

Prior attempts to cover three spectral lines have involved three separate spectrometers, three slits, three collimators, three gratings, three imaging systems, and three focal plane arrays ("FPA"s) behind a common foreoptic. In a prior spectrometer, common collector optics image radiation onto a first dichroic beamsplitter, which reflects a first portion of the radiation and transmits a portion of the radiation. The transmitted portion is incident on a second dichroic beamsplitter, which reflects a second portion of the radiation and transmits a third portion. The first, second, and third portions are incident on a first collimator, a second collimator, and a third collimator, respectively, which image the first, second, and third portions on a first grating, a second grating, and a third grating, respectively. A first imaging system, a second imaging system, and a third imaging system then image the first, second, and third portions reflected from the first, second, and third gratings, respectively, on a first FPA, a second FPA, and a third FPA. Here, a first FPA may be silicon, and the second and third FPAs may be mercury cadmium telluride.

In this spectrometer, three different first order gratings are required. For example, the gratings have about one micron of pitch, and are positioned at about eighteen degrees off the Littrow condition, which increases shadowing and decreases throughput. This gross triplication of hardware has size, weight, and cost impacts. For example, three million detectors may be purchased and only 0.6 million detectors may be actually used.

SUMMARY

This invention provides the sensing of three narrow bands (e.g., one oxygen line at 0.76 microns, and two carbon dioxide lines at 1.61 and 2.06 microns) at a high spectral resolution, and all within one instrument, which includes a single optical system, a single diffraction grating, and a single FPA. This invention integrates all three bands of interest into a single spectrometer with three slits, one collimating and imaging system, one grating, and one FPA. Therefore, embodiments of the present invention are greatly simplified compared to previous spectrometers in terms of size, weight, and cost, and have alignment and calibration advantages due to the fewer number of elements. Correspondingly, only one million detectors are purchased and 0.6 million detectors are used. Further, throughput (or transmission) advantages are realized in the use of the diffraction grating at only a few degrees off the Littrow condition.

An embodiment of the present invention provides a three-channel spectrometer including a beamsplitter element that receives an incident radiation and transmits a first portion, a second portion, and a third portion of the incident radiation. The three-channel spectrometer further includes a first slit that receives the first portion and transmits a first slit output radiation of a first wavelength, a second slit that receives the second portion and transmits a second slit output radiation of a second wavelength, and a third slit that receives the third portion of the incident radiation and transmits a third slit output radiation of a third wavelength. The three-channel spectrometer also includes a common optical form that receives and collimates the first, second, and third slit output radiation, and a dispersive element that receives and reflects the collimated first, second, and third slit output radiation from the optical form.

The three-channel spectrometer may further include a focal plane array, wherein the focal plane array receives and detects the reflected first, second, and third slit output from the dispersive element. The optical form may receive the reflected first, second, and third slit output radiation from the dispersive element and image the reflected first, second, and third slit output radiation on the focal plane array. The focal plane array may be adjacent the first slit, the second slit, and the third slit such that the focal plane array and the first slit, the second slit, and the third slit have a common image plane. The focal plane array may include a mercury cadmium telluride detector.

The dispersive element may be a reflection grating. The reflection grating may have an 8 micron pitch.

The beamsplitter element may include a first dichroic beamsplitter that receives the incident radiation, and reflects the first portion of the incident radiation and transmits a transmitted portion of the incident radiation, and a second dichroic beamsplitter that receives the transmitted portion, and reflects the third portion of the incident radiation and transmits the second portion of the incident radiation.

The three-channel spectrometer may further include a fore optic that images the incident radiation on the beamsplitter element. The fore optic may include a reflective triplet.

The optical form may be a double-pass all-reflective optical form. The optical form may include a reflective triplet. The reflective triplet may include a first mirror with a positive power, a second mirror with a negative power, and a third mirror with a positive power.

The first slit may have a width of about 3.6 mm to about 4.0 mm, the second slit may have a width of about 3.6 mm to about 4.0 mm, and the third slit may have a width of about 3.6 mm to about 4.0 mm. The first slit, the second slit, and the third slit may be located at a common image plane.

The first wavelength range may be from about 0.758 microns to about 0.772 microns, the second wavelength range may be from about 1.591 microns to about 1.621 microns, and the third wavelength range may be from about 2.042 microns to about 2.081 microns.

DETAILED DESCRIPTION

Figure 1:
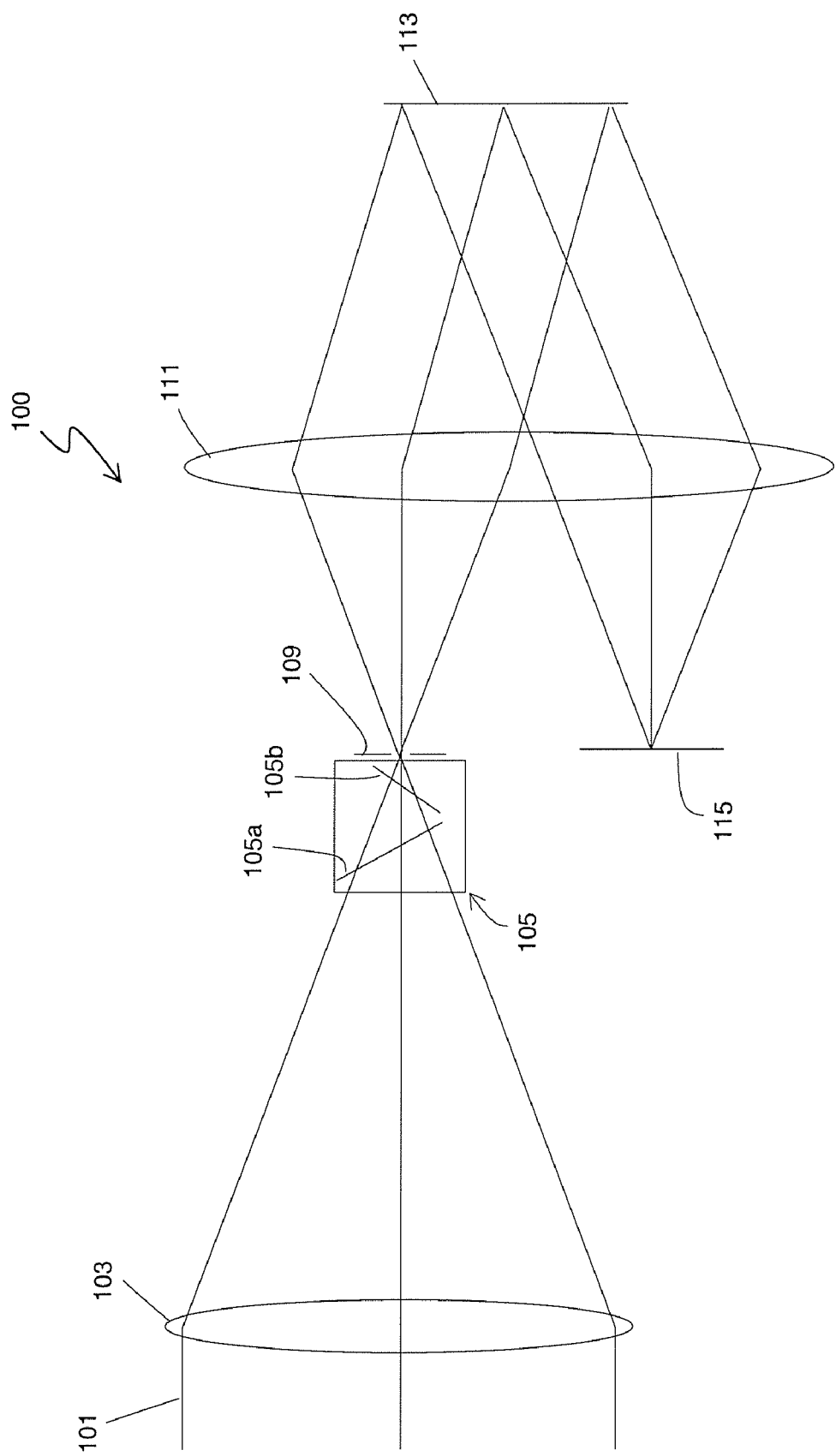
FIG. 1 shows a block diagram of a spectrometer according to an embodiment of the present invention.

A spectrometer according to an embodiment of the present invention receives radiation and breaks the radiation into colors for analysis. For example, a spectrometer may be utilized in the Orbiting Carbon Observatory to analyze radiation from the Earth to determine atmospheric carbon dioxide levels. In this example for carbon dioxide detection, there are three narrow bands of interest at wavelengths at 0.765 microns (e.g., from about 0.758 microns to about 0.772 microns), 1.606 microns (e.g., from about 1.591 microns to about 1.621 microns), and 2.062 microns (e.g., from about 2.042 microns to about 2.081 microns), with the range of the bands being from about 0.014 to about 0.039 microns wide. As used herein, a "wavelength" or "channel" means either a single discrete wavelength or a wavelength range. However, the present invention is not limited to this application and may be utilized in other scientific observation, resource sensing, and strategic surveillance applications as this invention is capable of gathering high spectral resolution data.

According to an embodiment of the present invention depicted in FIGS. 1-4, three bands of interest may be analyzed in a double pass spectrometer 100 using one grating for the three bands. Here, incident radiation 101 is received by a beamsplitter element 105. The beamsplitter element 105 splits the radiation 101 into three portions which pass through a slit system 109 and are then incident on a common optical form 111 that collimates all three portions. The collimated three portions are incident on a grating 113 which disperses and reflects the three portions. The three portions may then be imaged, by the same optical form 111, onto an FPA 115 where the three portions are detected for further analysis.

In more detail, incident radiation 101 is received by a fore optic 103. In an embodiment of the present invention, the fore optic 103 includes a first mirror 103a, a second mirror 103b, and a third minor 103c. The incident radiation 101 is initially incident on and reflected by the first mirror 103a, which may be a positive power minor. The second mirror 103b, which may be a negative power mirror, then receives and reflects the incident radiation 101 reflected by the first mirror 103a. The third mirror 103c, which may be a positive power mirror, then receives and reflects the incident radiation 101 reflected by the second mirror 103b so that the incident radiation 101 is imaged onto the beamsplitter element 105.

In an embodiment of the present invention, the fore optic may be a rear-stopped reflective triplet as disclosed in United States Patent Application No. 20100110539, the entire content of which is incorporated herein by reference.

The beamsplitter element 105 splits the incident radiation 101 into a first portion 106a, a second portion 106b, and a third portion 106c. As shown in more detail in FIG. 4, the incident radiation 101 may be imaged onto a first dichroic beamsplitter 105a that reflects the first portion 106a, which is then received and reflected by a first fold mirror 107a, and transmits a transmitted portion 108. A second dichroic beamsplitter 105b receives the transmitted portion, transmits a second portion 106b, and reflects a third portion 106c, which is then received and reflected by a second fold mirror 107b.

A slit system 109 receives the first portion 106a, the second portion 106b, and the third portion 106c such that a first slit 109a receives the first portion 106a, a second slit 109b receives the second portion 106b, and a third slit 109c receives the third portion 106c. As shown in more detail in FIG. 4, the first fold mirror 107a reflects the first portion 106a onto the first slit 109a, the second dichroic beamsplitter 105b transmits the second portion 106b onto the second slit 109b, and the second fold mirror 107b reflects the third portion 106c onto the third slit 109c. The first slit 109a permits first slit output radiation to pass through, the second slit 109b permits second slit output radiation to pass through, and the third slit 109c permits third slit output radiation to pass through.

The widths of the slits are optimized for spectrometry for each of the bands of interest. The slit width is usually dictated by the pixel size on the FPA, which is typically about 20 to about 40 microns. The first slit may have a width of about 3.6 mm to about 4.0 mm, the second slit may have a width of about 3.6 mm to about 4.0 mm, and the third slit may have a width of about 3.6 mm to about 4.0 mm.

Figure 2:
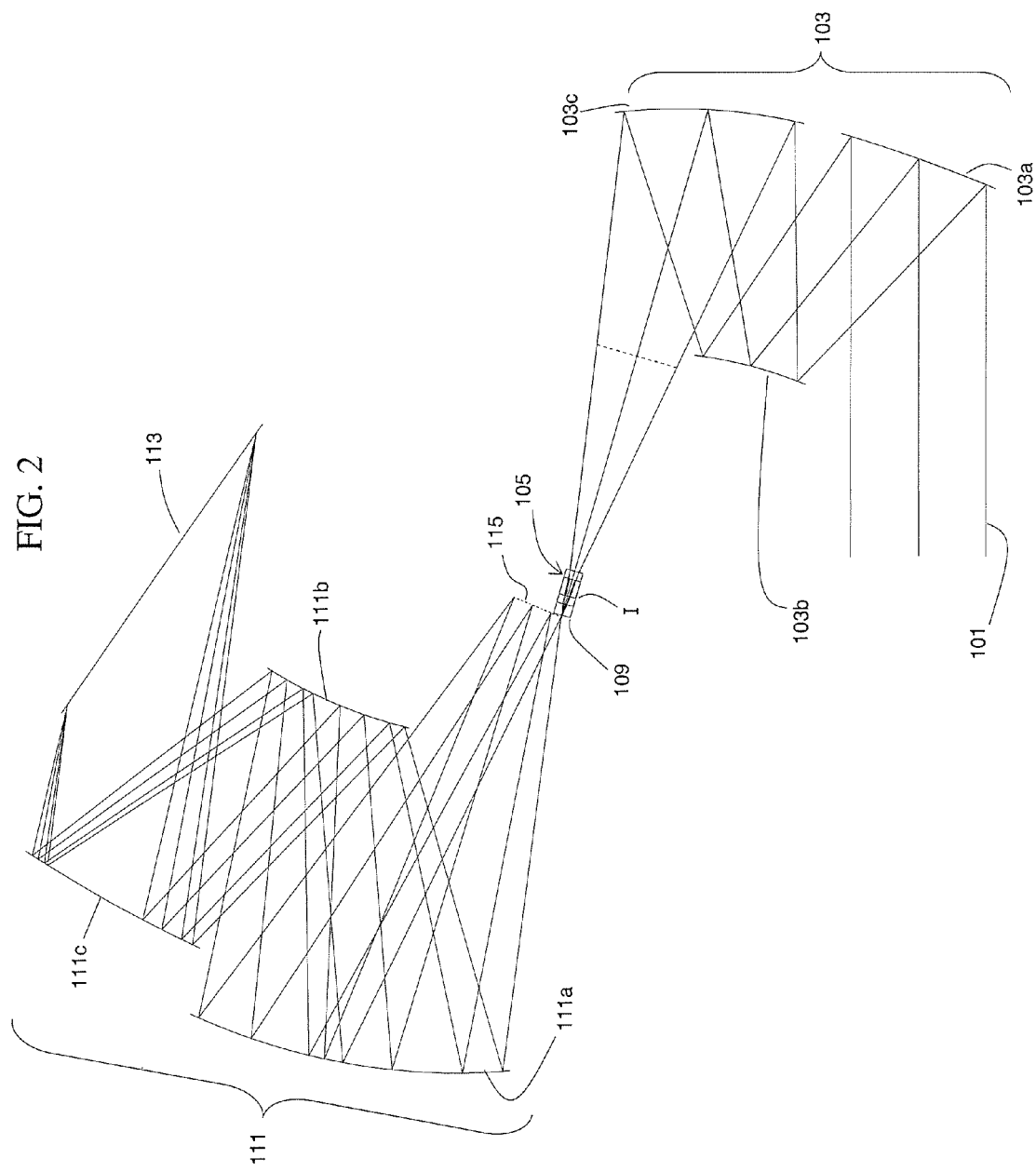
FIG. 2 shows a top schematic optical-path view of an embodiment of FIG. 1.
Figure 3:
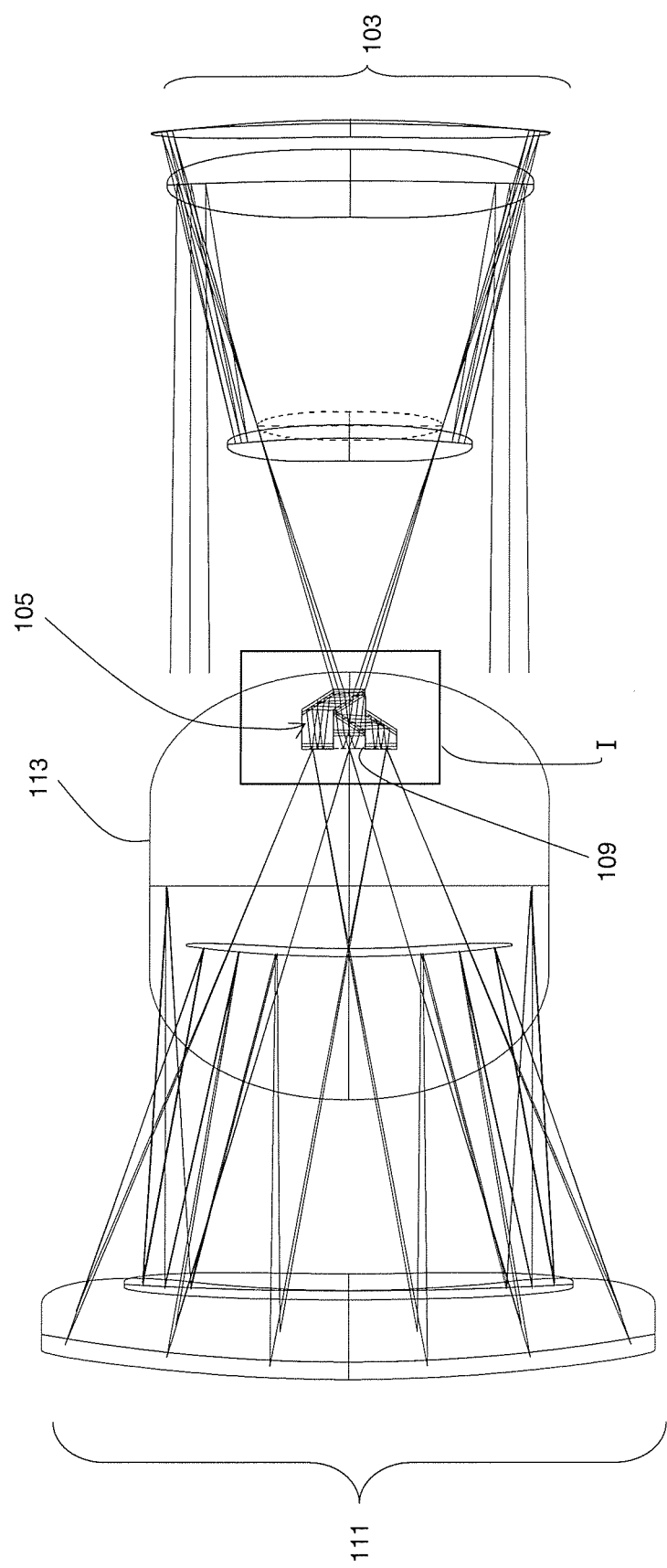
FIG. 3 shows side schematic optical-path view of an embodiment of FIG. 1.
Figure 4:
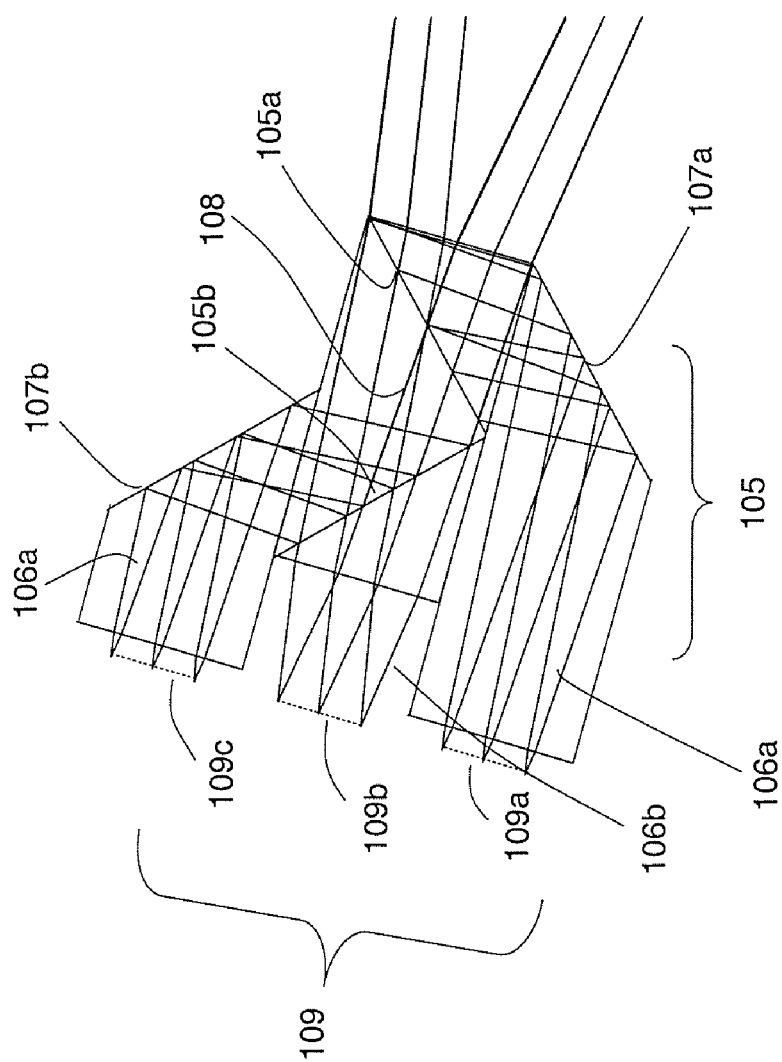
FIG. 4 shows an enlarged side view of area 1 of FIGS. 3 and 4.

As shown in FIG. 2, the first, second, and third slit output radiation is collimated onto the grating 113 by the optical form 111. In an embodiment of the present invention, the optical form 111 includes a primary mirror 111a, a secondary mirror 111b, and a tertiary mirror 111c. The first, second, and third slit output radiation is initially incident on and reflected by the primary mirror 111a, which may be a positive power mirror. The secondary mirror 111b, which may be a negative power mirror, then receives and reflects the first, second, and third slit output radiation reflected by the primary mirror 111a. The tertiary mirror 111c, which may be a positive power mirror, then receives and reflects the first, second, and third slit output radiation reflected by the secondary mirror 111b so that the first, second, and third slit output radiation is collimated onto the grating 113.

In an embodiment of the present invention, the optical form 111 may be a reflective triplet double-pass optical form as disclosed in U.S. Pat. No. 5,260,767 to Cook, the entire content of which is incorporated herein by reference.

In an embodiment of the present invention, the grating 113 is constructed such that the diffraction orders of the grating 113 disperse the 3 bands of interest. In other words, the grating 113 angularly disperses the radiation according to wavelength and reflects the radiation back for detection by the FPA 115, essentially forming images of the first, second, and third slits 109a, 109b, and 109c separated according to color. For example, the grating may have an 8 micron pitch. Here, the products of the wavelengths of the bands of interest and the diffreaction orders are about the same. For example, 0.765 microns*19=14.535
1.606 microns*9=14.454
2.062 microns*7=14.434.

By making the product of the wavelengths of the bands of interest and the diffraction orders a near-constant (or about the same value) for all three channels, the unified geometry results that allows a single double-pass optic, a single grating, and a single FPA.

According to the equation describing grating behavior:

$$m*\lambda/d = \sin(\theta_{in}) - \sin(\theta_{out})$$

where d is the grating pitch, m is the grating order, $\theta_{in}$ is the angle of the incident radiation, and $\theta_{out}$ is the angle of the reflected radiation. If $m*\lambda/d$ is a near constant, then the geometry related terms on the right ($\sin(\theta_{in})-\sin(\theta_{out})$) are also a near constant. Thus, the various spectral bands (and their respective grating orders, m) can pass through the same optic (in this case in both the collimating and imaging directions) in the same manner.

In an embodiment of the present invention, detailed grating simulations indicate 63-68% diffraction efficiency for the three bands of interest.

Figure 5:
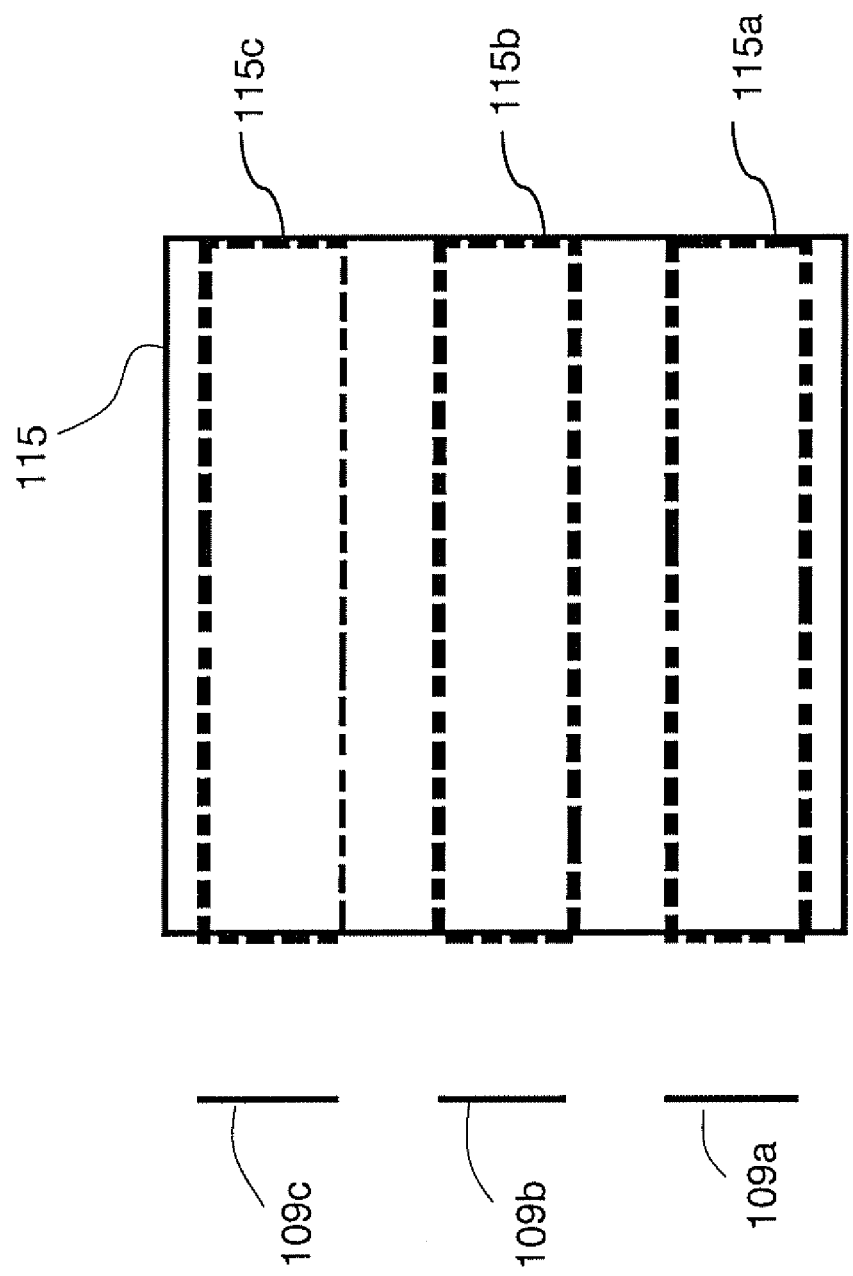
FIG. 5 shows an enlarge rear view of the slits and focal plane array of the spectrometer shown in FIG. 1.

Further, in an embodiment of the present invention, the double-pass optical form approach allows the slits and the dispersed spectra on the FPA to be adjacent to each other, as shown in FIG. 5, and allows the grating to be used only about 3 to about 4 deg off the Littrow condition, where the incoming radiation and the diffracted radiation both coincide with the normal to the grooves of the grating 113. This results in greater diffraction efficiency, because there is less facet shading than in previous spectrometers, which may be about 20 to about 22 deg off the Littrow condition as constrained by clearances between separate refractive collimating and imaging optics.

In an embodiment of the present invention, the FPA 115 receives and detects the dispersed radiation from the grating 113. Further, the optical form 111 may image the dispersed radiation on the FPA 115, as shown in FIG. 5. Here, the dispersed radiation from the grating 113 is received and reflected by the tertiary mirror 111c, then received and reflected by the secondary mirror 111b, then received and reflected by the primary mirror 111a, and then received by the FPA 115 in areas 115a, 115b, and 115c. The FPA detects the dispersed radiation, which may then be converted to an electrical signal for further analysis. For this reason, the optical form 111 is termed "double-pass" because the radiation travels from the image plane of the slit system 109 through the optical form 111 and is collimated on the way to the grating 113, and then on the way back from the grating 113 the radiation travels through the optical form 111 again and is imaged on the image plane of the FPA 115, where the FPA 115 and the slit system 109 have a common image plane, as shown in FIG. 5. The areas between 115a and 115b, and 115b and 115c are guard bands which separate the wavelengths of interest, and these areas are not utilized for detection.

In an embodiment of the present invention, the FPA is a mercury cadmium telluride detector. In another embodiment, 0.6 M of 1.0 M of pixels of the FPA are actually used, because pixels located in the guard bands are not utilized. However, the FPA may be optimized for various wavelengths according to the application. In another embodiment of the present invention, the FPA may include three separate arrays located in the same plane and suitably spaced for detecting the dispersed radiation.

In an embodiment of the present invention, the spectral resolution is very high, for example, $\lambda/\Delta\lambda$, is about 17,000 to about 20,000.

In an embodiment of the present invention, the integrated approach offers significant advantages in greater simplicity, lower cost, easier calibration than previous spectrometers. This approach also offers higher optical throughput relative to previous spectrometers.

Although the present invention has been described and illustrated in respect to exemplary embodiments, it is to be understood that it is not to be so limited, and changes and modifications may be made therein which are within the full intended scope of this invention as hereinafter claimed.

What is claimed is:

1. A three-channel spectrometer comprising:
   a beamsplitter element that receives an incident radiation and transmits a first portion, a second portion, and a third portion of the incident radiation,
   a first slit that receives the first portion and transmits a first slit output radiation of a first wavelength;
   a second slit that receives the second portion and transmits a second slit output radiation of a second wavelength;
   a third slit that receives the third portion of the incident radiation and transmits a third slit output radiation of a third wavelength;
   a common optical form that receives and collimates the first, second, and third slit output radiation; and
   a dispersive element that receives and reflects the collimated first, second, and third slit output radiation from the optical form.

2. The three-channel spectrometer of claim 1 further comprising a focal plane array, wherein the focal plane array receives and detects the reflected first, second, and third slit output from the dispersive element.

3. The three-channel spectrometer of claim 2, wherein the optical form receives the reflected first, second, and third slit output radiation from the dispersive element and images the reflected first, second, and third slit output radiation on the focal plane array.

4. The three-channel spectrometer of claim 2, wherein the focal plane array is adjacent the first slit, the second slit, and the third slit such that the focal plane array and the first slit, the second slit, and the third slit have a common image plane.

5. The three-channel spectrometer of claim 2, wherein the focal plane array comprises a mercury cadmium telluride detector.

6. The three-channel spectrometer of claim 1, wherein the dispersive element comprises a reflection grating.

7. The three-channel spectrometer of claim 6, wherein the reflection grating has an 8 micron pitch.

8. The three-channel spectrometer of claim 1, wherein the beamsplitter element comprises:
   a first dichroic beamsplitter that receives an incident radiation, and reflects the first portion of the incident radiation and transmits a transmitted portion of the incident radiation; and
   a second dichroic beamsplitter that receives the transmitted portion of the incident radiation, and reflects the third portion of the incident radiation and transmits the second portion of the incident radiation.

9. The three-channel spectrometer of claim 1 further comprising a fore optic that images the incident radiation on the beamsplitter element.

10. The three-channel spectrometer of claim 9, wherein the fore optic comprises a reflective triplet.

11. The three-channel spectrometer of claim 1, wherein the optical form is a double-pass all-reflective optical form.

12. The three-channel spectrometer of claim 1, wherein the optical form comprises a reflective triplet.

13. The three-channel spectrometer of claim 12, wherein the reflective triplet comprises a first mirror with a positive power, a second mirror with a negative power, and a third mirror with a positive power.

14. The three-channel spectrometer of claim 1, wherein the first slit has a width of about 3.6 mm to about 4.0 mm, the second slit has a width of about 3.6 mm to about 4.0 mm, and the third slit has a width of about 3.6 mm to about 4.0 mm.

15. The three-channel spectrometer of claim 1, wherein the first slit, the second slit, and the third slit are located at a common image plane.

16. The three-channel spectrometer of claim 1, wherein the first wavelength is about 0.765 microns, the second wavelength range is about 1.606 microns, and the third wavelength is about 2.062 microns.

* * * * *